COMPUTING DEVICE
Filed July 5, 1963 3 Sheets-Sheet 1
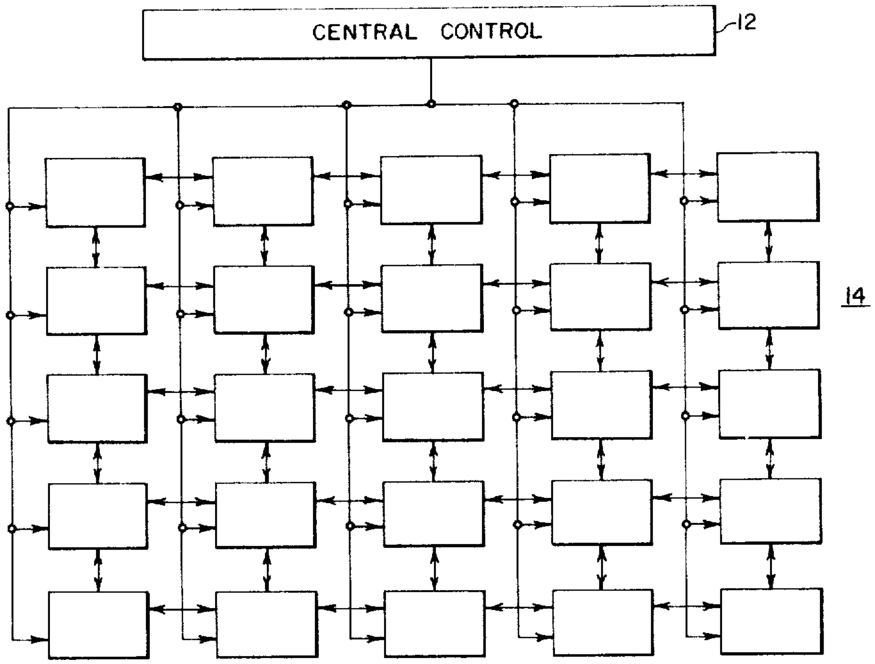
Fig.1.
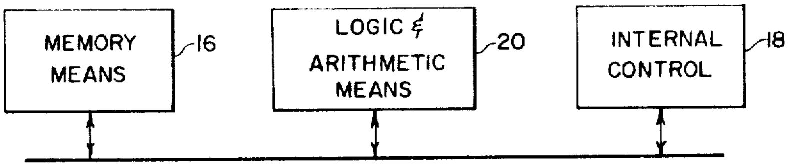
Fig.2.
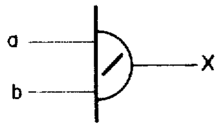
Fig.3.
| a | b | X |
|---|---|---|
| 0 | 0 | 1 |
| 0 | 1 | 1 |
| 1 | 0 | 1 |
| 1 | 1 | 0 |
Fig.4.
WITNESSES
Theodore T. Wrobel
James F. Young
INVENTOR
John R. Ball
BY Dean Schron
ATTORNEY United States Patent Office 3,296,426

Patented Jan. 3, 1967

3,296,426

COMPUTING DEVICE

John R. Ball, Pittsburgh, Pa., assignor to Westinghouse Electric Corporation, Pittsburgh, Pa., a corporation of Pennsylvania Filed July 5, 1963, Ser. No. 292,840
3 Claims. (Cl. 235—175)

This invention in general relates to computing apparatus, and more in particular to an apparatus for performing logic and arithmetic computations on binary operands.

The arithmetic portion of electronic digital computers generally comprise a plurality of logic gates for receiving two binary numbers to be added. In a serial type adder, a bit from both of the binary numbers to be added are simultaneously fed into the adder which then produces a sum output and a carry output which often necessitates the use of delay means so that the carry output can be fed back and used as an additioanl input along with the next bits in sequence of the binary numbers to be added. In addition to the extra delay means, various other gating devices are made integral with the adder to provide the capabilities of both arithmetic and logical computations. The addition of delay means and extra gating devices adds to the cost of a basic adder circuit. In one type of computer system there has been provided a parallel network type of system wherein a central control means provides a plurality of identical control signals to an array of identical processing elements each having its own individual memory means, its own internal control means, and its own logic and arithmetic means. Since this type of system may have over a thousand individual processing elements, the cost of several gating devices and delay means per processing element greatly increases the cost for the entire system.

It is therefore a primary object of the present invention to provide a binary adder using a minimal of logic devices.

It is another object to provide a binary adder with fewer logic devices which will also function as a logical AND circuit without the need for additional logic gates.

It is a further object to provide a binary adder which will function as an inclusive OR, and an exclusive OR without the need for additional gates.

It is another object to provide a binary logic and arithmetic circuit which operates on the $i^{th}$ bits of two binary numbers in a serial manner.

Briefly, in accordance with the above objects, there is provided a logic and arithmetic circuit including a first and second gating device each responsive to a state of operation of a bistable flip-flop such that when the flip-flop is in a one state of operation, one of the gating devices will be enabled, and when the flip-flop is in the other state of operation, the other of the gating devices will be enabled. These gating devices each receive, in a predetermined time sequential order, a first signal indicative of a first operand bit of a first number and if the signal has a predetermined value the enabled gating device will either change the state of operation of the flip-flop or not affect it. A second input signal indicative of a second operand bit of a second number is then fed to the two gating devices and if that signal has a predetermined value the enabled gating device will either change the state of operation of the flip-flop or not affect it. A second bistable flip-flop is provided to indicate any carries in an addition function and a gating means is provided to be responsive to this latter flip-flop to change the state of operation of the first flip-flop if certain predetermined conditions exist. The carry flip-flop is made responsive to one of the gating devices to change its state of operation in accordance with the input signals indicative of the numbers being added. With the proper control signals to the gating devices the circuit may be made to function as an adder, a logical AND circuit, a logical exclusive OR circuit and a logical inclusive OR. The states of operation of the first and second flip-flop devices at the end of a sequence of control signals may then be read as the results of a particular operation performed.

The above stated and further objects of the present invention will become more apparent upon a reading of the following detailed specification taken in conjunction with the drawings, in which:

FIGURE 1 illustrates one type of computer system in which the present invention may be used to great benefit;

FIG. 2 illustrates in more detail a portion of the computer network shown in FIG. 1;

FIG. 3 illustrates one type of logic or gating device which may be used in the present invention;

FIG. 4 illustrates a truth table for the gating device of FIG. 3;

Figure 5:
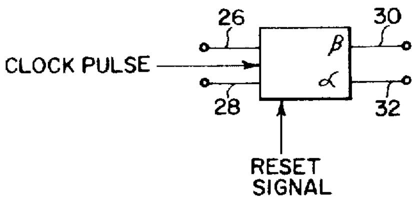
FIG. 5 illustrates a functional block diagram of one type of bistable device which may be used in the present invention.
Figure 5A:
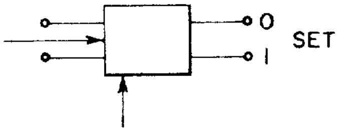
Figure 5B:
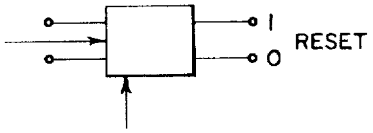
Figure 6:
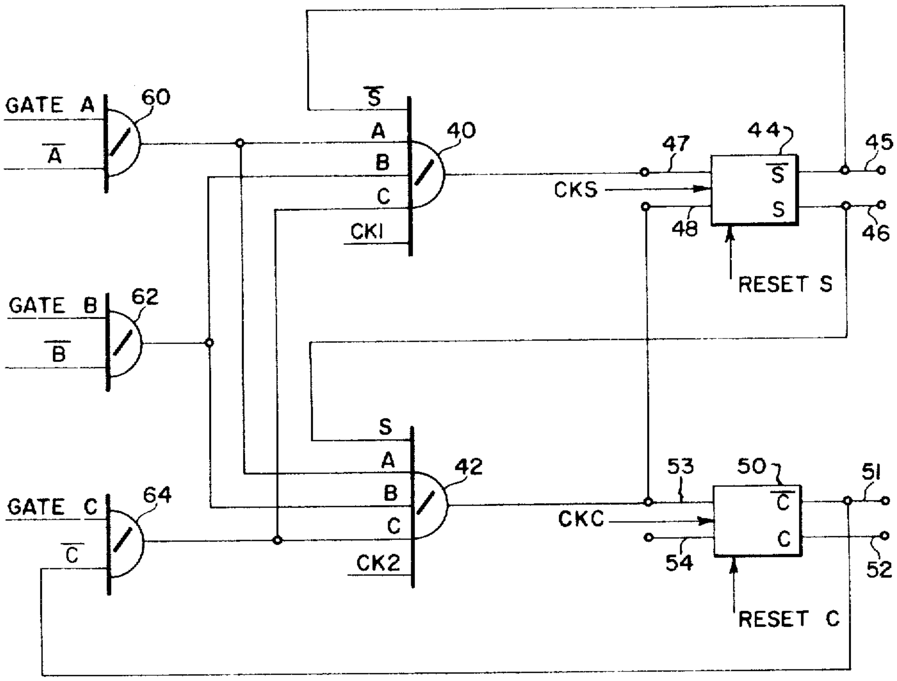
Figure 7:
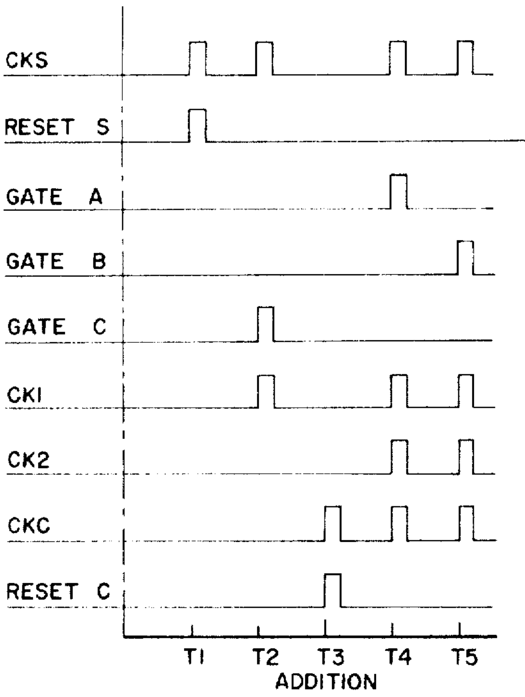
Figure 8:
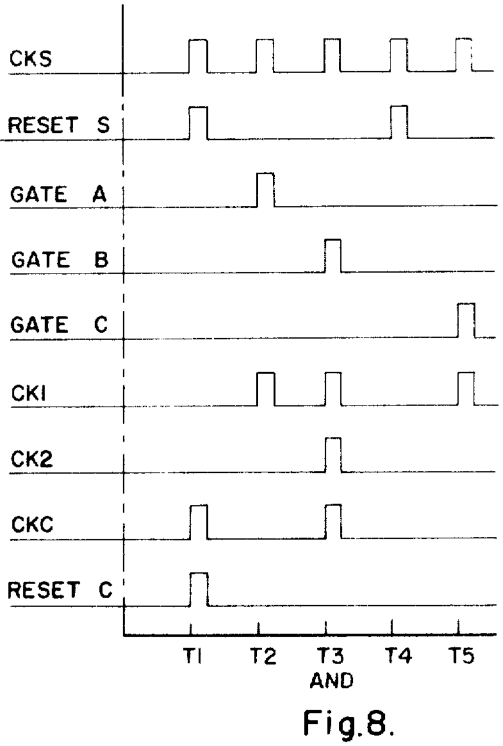
Figure 9A:
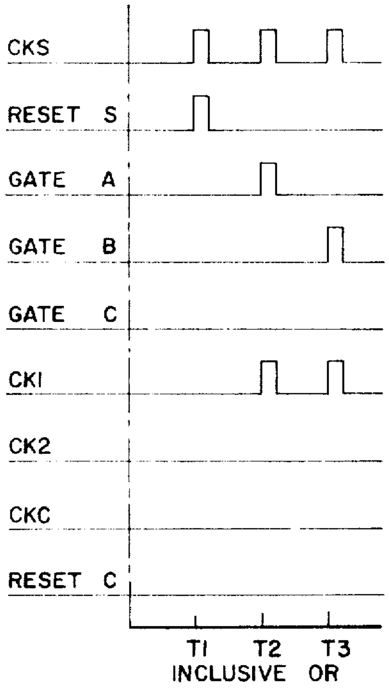
Figure 9B:
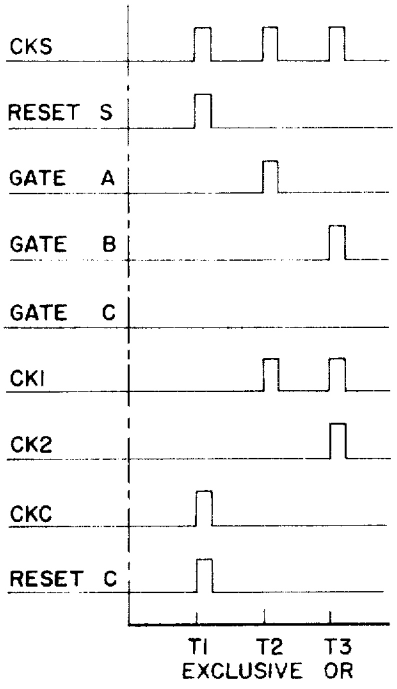

FIGS. 5*a* and 5*b* illustrate the output signals and define the state of operation of the device of FIG. 5;

FIG. 6 illustrates a preferred embodiment of the present invention;

FIG. 7 illustrates, in time sequence, gating signals provided to the circuit of FIG. 6 for accomplishing an addition;

FIG. 8 illustrates gating signals for accomplishing a logical AND function;

FIG. 9*a* illustrates the gating signals utilized in an inclusive OR operation; and FIG. 9*b* illustrates the gating signals utilized in an exclusive OR operation.

Referring now to FIG. 1, there is shown one type of computer system in which the present invention finds utility. Basically, the parallel network type computer shown in FIG. 1 comprises a central control means 12, having an associated memory, for providing a plurality of identical control signals to an array 14 of processing elements which then carry out, simultaneously, the command or commands as represented by the control signals. One such computer is more fully described and claimed in a copending application by Daniel Slotnik, Serial No. 242,234, filed December 4, 1962, and assigned to the assignee of the present invention. A typical processing element will be described with respect to FIG. 2.

The individual processing elements shown in FIG. 2 comprises memory means 16 for storing a plurality of multibit words, internal control means 18, and logic and arithmetic means 20 for performing desired logic operations and desired arithmetic operations on information stored in the memory means 16. The processing elements of the array 14 have the capability of transferring information to other predetermined processing elements in the array and therefore a logic and arithmetic means 20 of an individual processing element may operate on information stored in the memory means of preselected other processing elements. This type of computer system may have over one thousand individual processing elements and it may be seen that a reduction in the components utilized in each individual processing element is multiplied by the total number of processing elements thus resulting in a great savings in cost of the overall computer. By proper programming, and the addition of a slight amount of timing circuitry in the central control means, the present invention accomplishes this objective, although it is to be understood that the present invention may be used in any type of computer system to reduce the complexity of the logic and arithmetic unit contained therein. Before explaining an embodiment of the present invention shown in FIG. 6, reference should now be made to FIGS. 3, 4 and 5 which show logic devices which may be used herein, although it is to be understood that the invention is not limited thereto.

FIG. 3 shows a typical symbol for a stroke gate which is the common NOT-AND (NAND) circuit. The STROKE gate of FIG. 3 may include a plurality of inputs of which two are shown, one having the input signal *a* and the other having the input signal *b*; an output signal is indicated as *x*. In familiar binary form, and with reference to FIG. 4, the STROKE gate of FIG. 3 will provide a ONE output signal if any of its input signals are ZEROS and will provide a ZERO output signal only if all of its input signals are ONES. FIG. 5 shows a symbol which will be utilized herein to represent a flip-flop device, and the device utilized herein will be a ZERO set flip-flop having two stable states of operation. A ZERO set flip-flop operates such that if a ZERO signal appears on input terminal 26 it will cause the flip-flop to assume a state of operation with a ZERO output signal appearing on output terminal 30 and a ONE output signal appearing on output terminal 32. With a ZERO input signal appearing on input terminal 28 the flip-flop will be switched to a different state of operation with a ZERO output signal appearing on output terminal 32 and a ONE output signal appearing on output terminal 30. The presence of a ONE input signal on either of the input terminals 26 or 28 will not switch the state of operation of the flip-flop. A clock pulse is fed to the flip-flop for synchronization purposes and will enable the flip-flop to operate when the clock pulse is present and without which the flip-flop will not switch states of operation regardless of the input signals on the inputs terminals 26 and 28. The two states of operation, that is the set and reset states may be arbitrarily defined; for example, a ZERO at the $\alpha$ terminal, that is the lower terminal 32, (and a ONE at the $\beta$, the upper terminal 30) may indicate a set state of operation or a ONE at the $\alpha$, or lower (terminal 32), (and a ZERO at the upper or $\beta$ terminal 30) may represent a set state of operation. The ZERO set flip-flops used in the embodiment of the present invention shown in FIG. 6 will use the latter convention that is, a set state of operation will be indicated by a ONE at the lower terminal and a ZERO on the upper terminal, and a reset state of operation will be defined by a ZERO on the lower terminal and a ONE on the upper terminal as illustrated in FIGS. 5*a* and 5*b* respectively. A reset terminal 34 (FIG. 5) is provided for receiving a signal to place the flip-flop into a reset state of operation.

The logic and arithmetic circuit of FIG. 6 includes first and second gating devices 40 and 42 of the NAND type shown in FIG. 3. The gating devices 40 and 42 are each responsive to a different state of operation of a flip-flop 44, in that the output terminal 45 of flip-flop 44 is connected to one input of the gating device 40 and the other output terminal 46 of flip-flop 44 is connected to one input of the gating device 42 such that either one of the gating devices 40 or 42 is enabled, depending upon the state of operation of the flip-flop 44. The output of gating device 40 is connected to one input terminal 47 and the output of gating device 42 is connected to the other input terminal 48 of flip-flop 44 which also receives a clock pulse CKS and has reset means as was heretofore described with respect to FIG. 5. In order to provide an indication of a carry, in arithmetic operations, as well as entering into logic operations, there is provided a second bistable flip-flop 50 having output terminals 51 and 52, input terminals 53 and 54, and which receives a clock pulse CKC, in addition to having external resetting means. Any output signal provided by gating device 42, in addition to being fed to input terminal 48 of flip-flop 44, is also fed to the input terminal 53 of flip-flop 50. Gating devices 40 and 42 are operable to receive, in a predetermined time sequential order, input signals indicative of operand bits of numbers upon which predetermined operations are to be performed. Gating devices 40 and 42 receive an A input signal which may originate from a gating device 60, having as input signals, gate A, and the inverse of the operand bit, that is, $\bar{A}$. When gating device 60 is enabled by the GATE A signal, and the $\bar{A}$ signal is a ZERO, gate 60 will provide a ONE output signal, that is, the inverse of the inverse of the operand bit, and if the $\bar{A}$ signal is a ONE, gate 60 will provide a ZERO output signal. In a similar manner, gate 62 is operable to receive an enabling GATE B signal, in addition to the inverse of the B signal, representing an operand bit of a second number. The gating devices 60 and 62 therefore will each provide an output signal which is fed to the gating devices 40 and 42 and which signals are indicative of the value of the original operand bits A and B. In order to provide an indication of the state of operation of the flip-flop 50 there is provided gating means 64 which in addition to receiving the $\bar{C}$ signal from flip-flop 50 receives an enabling GATE C signal, and when enabled, will provide an output signal identical to the value of C, which signal is fed to the gating devices 40 and 42.

As was stated, one of the two gating devices 40 or 42 is selectively enabled in accordance with the state of operation of flip-flop 44. The output signal on the terminal 45 will hereinafter be termed the $\bar{S}$ signal and the signal on output terminal 46 will hereinafter be called the S signal. In a similar manner the signal appearing on output terminal 51 of flip-flop 50 will be the $\bar{C}$ signal and the signal appearing on terminal 52 will be termed the C signal. If either of the signals A or B have a predetermined value, the enabled one of the devices 40 or 42 will provide an output signal to switch the state of operation of one or both of the flip-flop devices 44 and 50. By way of example, suppose that flip-flop 44 is in a set state of operation such that S is a ONE and $\bar{S}$ is a ZERO thereby enabling gating device 42. Suppose further that the A signal has a predetermined value of ONE; the B, C and clock signal CK2 are all ONES as will hereinafter be demonstrated such that the gating device 42 will provide a ZERO output signal which causes the ZERO set flip-flop 44 to switch its state of operation such that the $\bar{S}$ signal will be ONE and the S signal will be a ZERO thereby enabling gating device 40. If the B signal is next examined and if it also has a predetermined value of ONE the enabled gating device 40 will provide a ZERO output signal to again switch the state of operation of the flip-flop 44. For a better understanding of the operation of the present invention reference should now be made to FIGS. 7, 8, 9A and 9B which show various gating signals in timed relation for performing various addition and logic functions.

FIG. 7 illustrates in time sequence, the gating signals for performing an addition on the $i^{th}$ bits of two binary numbers to be added. By way of demonstration the numbers 3 and 9 will be added in accordance with the following well known formula for sum and carry wherein S is the sum,
A is an $i^{th}$ operand bit of a first number,
B is an $i^{th}$ operand bit of a second number,
C is an old carry, and
C′ is a new carry.

$$S=\bar{A}\bar{B}C+A\bar{B}\bar{C}+\bar{A}B\bar{C}+ABC$$
$$C'=\bar{A}BC+A\bar{B}C+AB\bar{C}+ABC$$

The number 3 in familiar binary notation is 0011 and the number 9 in familiar binary notation is 1001. Initially at T1, CKS and the reset S signals are provided to reset the flip-flop 44 such that $\bar{S}$ is a ONE and S is a ZERO, and for this initial cycle flip-flop 50 is similarly reset such that the $\bar{C}$ signal is a ONE and the C signal is a ZERO. At time T2 the signal CKS, GATE C and CK1 are provided to set the sum flip-flop 44 if there is a carry present, and since C is a ZERO, there is no carry present and the sum flip-flop 44 will remain in its reset state of operation. At time T3 the CKC and the reset C signals are provided to reset the carry flip-flop 50 if it is set, and in the present instance will have no affect upon the flip-flop 50. At time T4 it is seen that in adition to the CKS, CK1, CK2, and CKC enabling signals, the GATE A enabling signal is provided such that the gating device 60 will pass the first, that is, the rightmost operand bit of the first number, which bit, in the present example is a ONE. The ONE signal is fed to both gating devices 40 and 42, and since the sum flip-flop 44 is in a reset state of operation, gating device 40 will be enabled, and will provide a ZERO output signal since all of its inputs are ONES, as was demonstrated with respect to FIG. 4. The ZERO output signal provided by gating device 40 causes the sum flip-flop 44 to switch to a set state of operation such that the S signal is a ONE and will enable the gating device 42. At time T5 in addition to the enabling signal CKS, CK1, CK2 and CKC, the GATE B enabling signal is provided such that gating device 62 will provide an output signal which is the first operand bit of the second number, and which output signal is fed to both gating devices 40 and 42; with gating device 42 having all ONES as inputs, it will provide a ZERO output signal which causes the sum flip-flop 44 to reset, in addition to causing the carry flip-flop 50 to set. It is seen that at the end of the first sequence of signals operating on the first operand bits of the first and second number, the value of S will be ZERO and the value of C will be ONE. The sequence of signals is repeated with the second operand bits of the two numbers and in the present example A will be a ONE and B will be a ZERO. At time T1 the sum flip-flop 44 is provided with a reset signal, and since it is reset, will not change its state of operation. At time T2 the CK1 signal to gating device 40 is made a ONE, gating means 64 is enabled by the presence of the GATE C signal, to thereby allow gating means 64 to provide an output signal having a value of ONE since the C signal of the carry flip-flop 50 is a ONE. Since the $\overline{S}$ signal enables gating device 40, an output signal of ZERO will be provided to cause the sum flip-flop 44 to switch its state of operation to a set condition, that is S is a ONE and $\overline{S}$ is a ZERO. At this point gating device 42 is enabled by the S signal having the value of ONE. At time T3 the reset C and the CKC signals reset the carry flip-flop 50. At time T4 the A operand bit is examined as was demonstrated in the first sequence of signals and since the A operand in this instance is a ONE, the enabled gating device 42 will provide a ZERO output signal to reset the sum flip-flop 44 and set the carry flip-flop 50. In a like manner at time T5 the B operand bit is examined and in this instance has a value of ZERO. The presence of a ZERO signal on each of the gating devices 40 and 42 causes each to provide a ONE output signal which have no effect on the ZERO set flip-flops 44 and 50, and it is seen that at the end of the second sequence of timing cycles S has a value of ZERO and C has a value of ONE. The third operand bits of the two numbers are then sequentially examined, and in the present example each have a value of ZERO. The sum flip-flop 44 is reset at time T1, it is set at time T2 since there was a previous carry. The carry flip-flop is reset at time T3, and since both of the operand bits are ZEROS, each of the gating devices 40 and 42 will receive these ZEROS in a predetermined time sequence, that is A then B, and the output signals from the gating devices 40 and 42 will remain ONES and will have no affect upon the flip-flops 44 and 50 and it is seen that at the end of the third sequence of signals S has a value of ONE since it was set at time T2, and C has a value of ZERO since it was reset at time T3. The next operand bits of the two numbers are then examined, and in the present example A has a value of ZERO and B has a value of ONE. Since there was no carry from the previous cycle, the sum flip-flop 44 will remain in a reset state of operation caused at time T1. With the sum flip-flop 44 in a reset state of operation, gating device 40 is enabled, and at the time T4 gating signals are provided, with the A input signal appearing on the inputs of gating devices 40 and 42. The presence of the ZERO input signal causes ONE output signals which have no affect on either of the flip-flops 44 or 50. At time T5 the B input signal is examined and is fed to the inputs of gating devices 40 and 42. Since gating device 40 is the enabled one of the two gating devices, it will provide a ZERO output signal to set the sum flip-flop 44, and it is seen that after the fourth sequence of signals S is a ONE and C is a ZERO. It is thus seen that the circuit of FIG. 6 has functioned to provide an output signal of 1100 which in familiar binary notation is the number 12, the results of adding 0011 (3) and 1001 (9). In a logical AND function, a result will be produced if and only if an A operand and a B operand are ONES. As a further demonstration reference should now be made to FIG. 8 which in conjunction with FIG. 6 will demonstrate an AND operation.

At time T1 both the flip-flop 44 and the flip-flop 50 are placed into their reset condition. Suppose for purposes of demonstration two operands each having a value of ONE are to be ANDed. At time T2 the first operand, A, is examined by the provision of the GATE A signal and in addition the CKS signal to flip-flop 44, and CK1 signal to gating device 40 are provided. The gate 60 will provide a ONE signal to gating device 40 which is enabled by the reset state of operation of the flip-flop 44 and will provide a ZERO output signal to switch the state of operation of the flip-flop 44 to its set condition. At time T3 the GATE B signal is provided to examine the B input signal and in addition, the CKS, CK1, CK2 and CKC signals are provided. With the flip-flop 44 in its set state of operation the gating device 42 is enabled and with the gate 62 providing a ONE input signal, gating device 42 will provide a ZERO output signal to reset the flip-flop 44 and set the flip-flop 50. At time T5 the flip-flop 44 is enabled by the CKS signal, the CK1 enabling signal is provided to gating device 40 and the GATE C signal is provided to gating means 64 such that it will produce an output indicative of the state of operation of the flip-flop 50 and in this instance, gating means 64 will provide a ONE output signal which is fed to the gating devices 40 and 42. Gating device 40 therefore receives all ONE input signals to provide a ZERO output signal to place the flip-flop 44 into a set state of operation such that at the end of the gating signal sequence, S will be a ONE indicating that both A and B were ONES. Conversely, suppose now that one of the signals is a ZERO, for example the B signal. At time T1 both of the flip-flops 44 and 50 are placed into their reset state of operation, and at time T2 the A signal is examined which causes the enabled gating device 40 to provide a ZERO output signal to switch the state of operation of flip-flop 44 such that the S signal is a ONE and the $\overline{S}$ signal is a ZERO as was demonstrated in the prior example. At time T3 the CKS, CK1, CK2 and CKC signals are provided in addition to the GATE B signal to examine the B operand which in this instance is a ZERO and both of the gating devices 40 and 42 which receive this ZERO signal will provide ONE output signals which have no effect on either the flip-flops 44 or 50. At time T4 the flip-flop 44 is placed back into its reset state of operation to enable the gating device 40. At time T5 the state of operation of the flip-flop 50 is examined and the gating means 64 will provide a ZERO output signal since the flip-flop 50 is in its reset state of operation, and the gating devices 40 and 42 will provide ONE output signals in response to the ZERO input signal and will not affect the state of operation of either flip-flop. It is thus seen that the end of the latter sequence of cycle, S is a ZERO indicative of the fact that both A and B were not ONES.

By applying the signals shown in FIG. 9A for an inclusive OR operation it may be demonstrated that the circuit of FIG. 6 will provide an S signal of ONE if either of two operands A or B is a ONE, and in this particular operation it is seen that the flip-flop 50 and the gating means 64 are not utilized. In a similar manner by applying the signals shown in FIG. 9B to the circuit of FIG. 6 an exclusive OR operation of the circuit may be demonstrated wherein S will be a ONE if either A and B are a ONE but not both.

Accordingly, there has been provided computer apparatus which will perform both arithmetic and logic functions with a minimal number of gating devices. Although the invention is best adapted to be used in a computer system having a plurality of such logic and arithmetic units, it is to be understood that the invention will operate equally as well in a computer system wherein only one logic and arithmetic means is provided.

Although the present invention has been described with a certain degree of particularity, it should be understood that the present disclosure has been made by way of example and that modifications and variations of the present invention are made possible in the light of the above teachings.

What is claimed is:

1. Apparatus for adding two numbers each represented by a plurality of operand bits having either a first or second signal value comprising:

a sum flip-flop having at least two input terminals and two states of operation;

a carry flip-flop having at least one input terminal and two states of operation;

first and second gating devices each having a plurality of inputs with one of said inputs operably connected to said sum flip-flop such that when it is set, said second gating device is enabled and when it is reset, said first gating device is enabled, said first gating device having output means operatively connected to one input terminal of said sum flip-flop, said second gating device having output means operatively connected to another input terminal of said sum flip-flop and said one input terminal of said carry flip-flop;

gating means responsive to the state of operation of said carry flip-flop for providing a signal to set said sum flip-flop if said carry flip-flop is set;

said first and second gating devices additionally responsive to an $i^{th}$ operand bit of said two numbers such that if either bit is present said first gating device will set said sum flip-flop if it is reset and will reset said sum flip-flop and set said carry flip-flop if said sum flip-flop is set.

2. A logic and arithmetic unit for use in a computer having a central control means for providing sequencing control signals to a plurality of processing elements comprising:

a flip-flop having a set and reset state of operation;

means responsive to the state of operation of said flip-flop for providing an output signal indicative thereof;

a second flip-flop;

a first gating device responsive to said control signals and said output signal to change the state of operation of said second flip-flop if said first flip-flop is in a set, and said second flip-flop is in a reset state of operation;

a second gating device;

said first and second gating devices each responsive to a different state of operation of said second flip-flop and predeterminned time sequential first and second operand input signals such that when said second flip-flop is in one state of operation said first gating means will provide a set signal to set said second flip-flop and when said second flip-flop is in the other state of operation said second gating device will provide a resetting signal to reset said second flip-flop if said first and second input signals have a predetermined value.

3. In combination;

a first bistable device having input means and output means for indicating two stable states of operations;

a second bistable device having input means and output means for indicating two stable states of operation;

first means responsive to the state of operation of said second bistable device for providing a signal indicative thereof;

first and second gating devices each having output means operatively connected to the input means of said first bistable device and having input means operatively connected to the output means of said first bistable device such that when said first bistable device is in a first state of operation one of said gating devices is enabled and when in a second state of operation the other of said gating devices is enabled;

said first gating device operable in response to a predetermined time sequential order of the signal provided by said first means, a first input signal indicative of a first operand, and a second input signal indicative of a second operand, such that if said first gating device is enabled it will switch the state of operation of said first bistable device if any of said signals have a predetermined value;

said second gating device operable in response to a predetermined time sequential order of the signal provided by said first means, said first input signal and said second input signal, such that if said second gating device is enabled it will switch the state of operation of said first bistable device if any of said signals have a predetermined value and will place said second bistable device into a first state of operation.

References Cited by the Examiner

UNITED STATES PATENTS 2,898,040 8/1959 Steele ............. 235—175

ROBERT C. BAILEY, *Primary Examiner.*

G. D. SHAW, *Assistant Examiner.*